Dec. 6, 1927. 1,651,384
W. GILES
PAN LIFTER AND REMOVER
Filed June 2, 1927

Inventor:
William Giles

Patented Dec. 6, 1927.

1,651,384

UNITED STATES PATENT OFFICE.

WILLIAM GILES, OF CHICAGO, ILLINOIS.

PAN LIFTER AND REMOVER.

Application filed June 2, 1927. Serial No. 195,939.

This invention relates to kitchen utensils adapted for use in lifting, carrying and placing hot pans, plates or similar containers.

I am aware that there are many devices provided for this purpose but all such require a substantial space between adjacent pans in order that the device may be positioned between the pan to be lifted and adjacent pans, to start the lifting operation.

The principal object of the invention is to provide a lifter of the class described, which will engage and lift a pan from the oven or permit its replacement by another without disturbing adjacent pans, however close they may be positioned to the pan to be lifted or replaced, thereby permitting the oven space to be utilized to its fullest capacity.

In large ovens where it is desirable, from the standpoint of economy, to utilize its full capacity it is often desirable to remove a pan positioned in the oven at some distance from the opening and to replace it with another without disturbing pans positioned between the pan to be removed or replaced and the opening. With devices constructed on the order of tongs, which have to be spread to engage the pan to be lifted, this is difficult if not impossible, and another object of the invention is the provision of a lifter of the class described which is adapted to engage and lift or discharge a pan however remote its position relative to the opening, without disturbing other pans adjacent thereto on the side next to the door of the oven.

A further object of the invention is to provide a device of the class described that can be used to carry the pan from place to place without danger of its falling off or spilling the contents.

A still further object is the provision of a device of the class described which can be used to handle any shaped pan.

Still another object is the provision of a pan lifter which is simple to construct and assemble and inexpensive to manufacture.

Another object is to generally improve pan lifters.

Other objects and advantages of the invention will appear in the following detailed description, taken in connection with the accompanying drawings, forming a part of this specification, and in which drawings.

Figure 1:
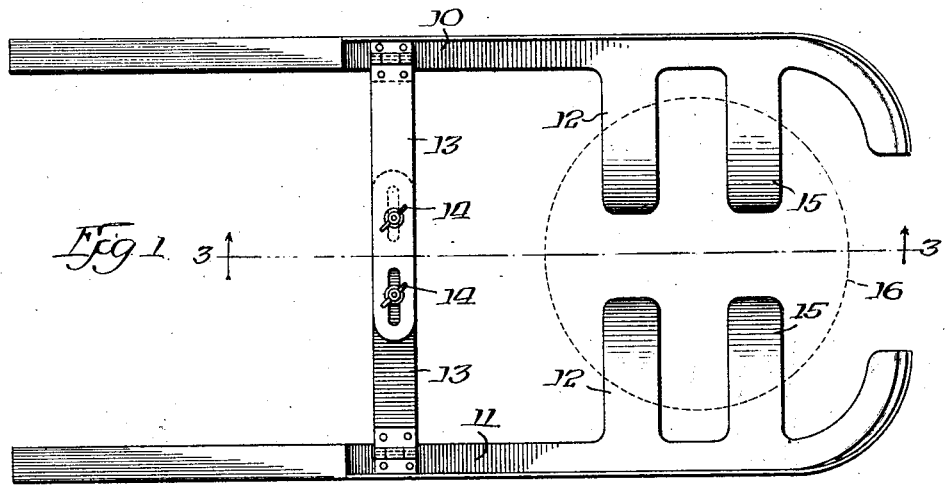
Fig. 1 is a plan view of a pan lifter embodying the invention.

The preferred embodiment of the invention includes a pair of arms 10 and 11, connected by a cross bar 13. The arms 10 and 11 are provided with a hinged connection to the bar 13 so that the arms may be independently or simultaneously rotated about their longitudinal axes.

The cross bar 13 is in two sections and is adjustable by means of a pair of thumb screws 14 in order that the arms 10 and 11 may be spaced closer or at greater distance apart depending upon the size of pans to be lifted. The operator's end of the arms 10 and 11 are shown angular in cross section but they may be made of any shape convenient for handling or use. The opposite end of the arms 10 and 11 are preferably angular in cross section and are turned inwardly and slightly upwardly to act as retainers to prevent the pan from slipping off the end between the arms, when used as a carrier. Positioned between the cross bar 13 and the curved ends of the arms 10 and 11 and projecting inwardly from each of the arms are fingers 12 and 15.

The fingers 12 and 15 curve slightly upward to about the same extent as the extreme end of the arms 10 and 11 and are spaced apart sufficiently that a pan 16 may be supported and carried thereon without any difficulty. The fingers 12 and 15 are spaced sufficiently close to each other and to the curved ends of the arms 10 and 11 that a pan may, in carrying, be slid towards and against said curved ends without falling off between the fingers 15 and the curved ends.

Figure 2:
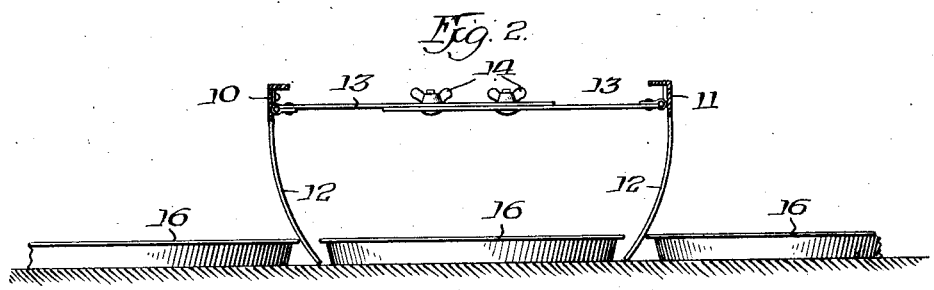
Fig. 2 is a transverse sectional view showing the handles of the lifter rotated inwardly about horizontal axes to bring the lifter to a position to advantageously engage one of several pies positioned in close proximity.
Figure 3:
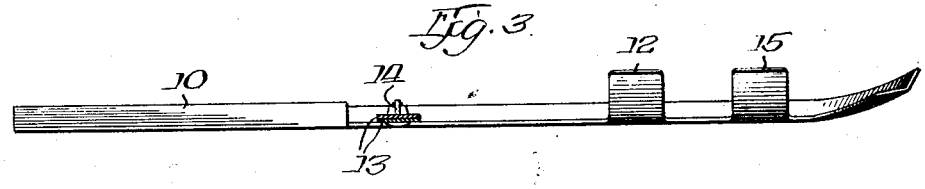
Fig. 3 is a view along the line 3—3 of Fig. 1.
Figure 4:
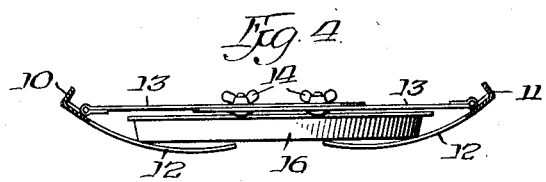
Fig. 4 is an end view of the lifter showing the position adapted for best carrying a pan.

To operate the lifter, the arms 10 and 11 are turned until the fingers 12 and 15 are substantially vertical. This position is indicated in Fig. 2, although the fingers can, if necessary, be given a position more completely vertical than is there shown. The arms 10 and 11 are then rotated outwardly thereby forcing the tips of the fingers 12 and 15 underneath the pan 16 and lifting the pan clear of its support and above the adjacent pans. Further rotation of the arms 10 and 11 outwardly will bring the device to the position shown in Fig. 4, which is a position of complete equilibrium for the pan. In removing the pan from the lifter, the reverse operation can be used, if it is desired to accurately position a pan in an unoccupied space in the oven surrounded by other pies to accurately position it elsewhere. If the pan is to be positioned at random, as on a table or the like, it can be easily and quickly discharged from the lifter by letting the pan slide against the curved ends of the arms at the same time that the arms are being rotated to open position.

Thus it will be seen that I have provided a pan lifter and carrier which enables a pan to be lifted from among others in close proximity thereto in an oven or the like or to be discharged accurately in such a position without disturbing the adjacent pans and which permits the pan to be safely carried without danger of dropping the pan or spilling its contents.

I claim—

1. A tool of the class described, comprising a pair of arms, each arm having one end curved inwardly and upwardly and each having a plurality of inwardly extending fingers having substantially the same upward curvature as said ends, a cross bar connecting said arms, a hinge connecting each end of said bar with the adjacent arm, the axis of rotation of each of said hinges being substantially parallel to the longitudinal axes of the arms.

2. A tool of the class described, comprising a pair of arms each having a plurality of inwardly extending fingers adjacent one end of said arms, a cross bar connecting said arms, a hinge connecting each end of said bar with the adjacent arm, the axis of rotation of each of said hinges being substantially parallel with the longitudinal axes of said arms and means for varying the spacing between the arms.

In witness whereof, I have hereunto subscribed my name this 27th day of May A. D., 1927.

WILLIAM GILES.